United States Patent
McCann et al.

[11] 4,021,825
[45] May 3, 1977

[54] ADAPTER FOR OPERATIVELY COUPLING AN AUTOMATED CAMERA TO AN OPTICAL INSTRUMENT

[75] Inventors: John J. McCann; Mary A. McCann, both of Belmont; William T. Plummer, Concord; Myron A. Seiden, Needham; Vivian K. Walworth, Concord, all of Mass.

[73] Assignee: Polaroid Corporation, Cambridge, Mass.

[22] Filed: May 15, 1975

[21] Appl. No.: 577,915

[52] U.S. Cl. .................................. 354/79; 354/237; 354/238
[51] Int. Cl.² .......................................... G03B 17/48
[58] Field of Search ............ 354/79, 154, 156, 237, 354/238, 85, 86, 51, 137, 138, 239, 240

[56] References Cited

UNITED STATES PATENTS

| | | | |
|---|---|---|---|
| 2,967,456 | 1/1961 | Maier | 354/79 X |
| 3,292,490 | 12/1966 | Moore | 354/79 |
| 3,490,347 | 1/1970 | Seedhouse | 354/79 X |
| 3,643,572 | 2/1972 | Kurei | 354/156 |
| 3,678,822 | 7/1972 | Ueda et al. | 354/51 |
| 3,744,385 | 7/1973 | Burgarella et al. | 354/51 |
| 3,774,516 | 11/1973 | Burgarella et al. | 354/86 |
| 3,798,665 | 3/1974 | Eloranta et al. | 354/79 |
| 3,812,512 | 5/1974 | Shimizu et al. | 354/258 |
| 3,898,678 | 8/1975 | Walworth | 354/79 |

Primary Examiner—L. T. Hix
Assistant Examiner—Alan Mathews
Attorney, Agent, or Firm—John S. Vale

[57] ABSTRACT

An adapter for operatively coupling a reflex camera having a preprogrammed automatic cycle of operation to an optical instrument such as a microscope or telescope. The adapter includes mechanisms which permit the operator to selectively modify the preprogrammed cycle of operation for the purpose of making extended time exposures or allowing vibrations induced by the movement of a camera reflex member to subside prior to initiating film exposure.

22 Claims, 10 Drawing Figures

ADAPTER FOR OPERATIVELY COUPLING AN AUTOMATED CAMERA TO AN OPTICAL INSTRUMENT

BACKGROUND OF THE INVENTION

1. Field of the Invention

The present invention relates to the field of photography and, more particularly, to adapters for operatively coupling cameras to microscopes, telescopes and other optical instruments.

2. Description of the Prior Art

The present invention provides an adapter for operatively coupling a camera having automatic exposure control to an optical instrument such as a microscope, telescope, or other optical apparatus having an eyepiece lens for observing an image therethrough.

In a preferred embodiment, the adapter is particularly well suited for use with a battery powered, automated, single lens reflex camera of the self-developing type such as the SX-70 Land Camera marketed by the Polaroid Corporation, Cambridge, Mass.

To operate such an automated camera, the user observes the scene or image to be photographed through the reflex viewing system and adjusts the objective lens for sharp focus. Upon actuating a camera start button, the camera proceeds through an automatic cycle of operation wherein: 1) a normally open shutter closes and a reflex member pivots from a viewing and focusing position to an exposure position; 2) the shutter reopens to begin the exposure phase, the length of which is determined by a light sensing circuit that includes a camera mounted photocell for receiving light from the scene or image being photographed; 3) the light sensing circuit provides a trigger signal whereupon the shutter is closed to terminate exposure; and 4) the film unit is advanced from the exposure position, through a pair of pressure applying rollers, and then out of the camera through a film exit slot, while at the same time, the reflex member is pivoted back to the viewing position, the shutter is reopened, and the operating cycle is automatically terminated.

Adapters for operatively coupling such a camera to microscopes and other optical instruments are disclosed in the prior art. For example, U.S. Pat. No. 3,798,665 describes an adaptor for mounting the camera on one eyepiece tube of a binocular microscope. The adaptor also includes means for directing scene light transmitted through the other eyepiece to the photocell such that the light sensing circuit may automatically control the exposure interval. U.S. Pat. No. 3,721,170 discloses another type of adapter, for use with a monocular microscope, which includes a beam splitter for diverting a portion of the scene light to the camera mounted photocell.

Other adapters for coupling cameras to optical instruments are disclosed in copending applications Ser. Nos. 420,913 and 420,915 filed on Dec. 3, 1973 (now U.S. Pat. Nos. 3,900,858 and 3,898,678 respectively). These disclosures relate to prismatic elements and/or methods for directing scene light to the photocell without diminishing the intensity of light that is available for exposing the film unit.

The prior art adapters serve two functions. The first is to mount the camera on the optical instrument so that the camera objective lens is in optical alignment with the instrument eyepiece. The second function is to provide a light transmission path to the camera mounted photocell. Control over the exposure of the film unit, however, is governed by the automatic exposure control circuit.

It has been found that while the automated cycle of camera operation is well suited for most general picture taking situations, there are special photographic conditions associated with taking photographs through optical instruments that sometimes exceed the limits for which the camera has been programmed.

As noted earlier, the first step in the automated cycle of operation includes the pivotal movement of the reflex member from the viewing and focusing position to the exposure position which is soon followed by the film exposure phase. The reflex member is a rather large (approximately 3 inches × 3 inches) plate-like member having a substantial mass. The rapid acceleration of this mass towards the exposure position imparts substantial kinetic energy to the reflex member which must be dissipated when the member is abruptly stopped at the exposure position.

A substantial portion of the energy is transferred to the internal framework and body of the camera. When the camera is hand held, this energy is in turn absorbed by the user's body. Likewise, if the camera is mounted on a structure having substantial mass, such as a tripod or heavily constructed optical instrument, the energy is transferred to and absorbed by the structure.

However, there are a number of optical instruments that have eyepiece tubes of rather light construction. When the relatively heavy camera is mounted on the end of the tube, and the reflex member pivots to the exposure position, vibrations are induced in the camera/instrument system because the tube lacks sufficient rigidity and mass to either absorb or transfer energy in an efficient manner.

Generally, these vibrations take from 1 to 3 seconds to damp out and may persist into the beginning of the exposure phase thereby causing a blurring of the image formed at the exposure plane. The vibration effect is particularly serious when working at high magnifications. Small movements of the object being observed are magnified proportionately and are displayed as large movements at the camera exposure plane. The blurring effect is also observed at lower magnifications when the object under observation is well illuminated thereby requiring a relatively short exposure interval. Under these conditions, the camera/instrument system may be vibrating for a significant portion of the total exposure interval causing a blurring of the recorded latent image.

Another limitation of the preprogrammed automatic cycle of camera operation comes to light when taking photographs at very low ambient light levels, such as through a telescope or attempting to photograph an object or sample having very low reflectivity or light transmission properties. Under these conditions, relatively long (approximately 1 to 3 minute) exposures are required. Because the above-described camera is intended for general purpose use, it has a maximum exposure interval of approximately 20 seconds. That is, when there is insufficient light for the photocell circuit to produce the exposure terminating trigger signal within the 20-second limit, the exposure phase is automatically terminated at the end of 20 seconds by a preprogrammed timing circuit.

Also, there are certain photographic situations when the photocell will provide erroneous readings because of special properties of the object being observed and- /or the unusual nature of the light reflected therefrom or transmitted therethrough. The photocell circuit is programmed to read the average light intensity emanating from the scene or object. When there is, for example, a wide range of contrast, the average reading may not result in an exposure that will capture the details of object that one wishes to observe.

SUMMARY OF THE INVENTION

The present invention provides an adapter for operatively coupling a battery powered, automated, single lens reflux camera, preferably of the self-developing type, to a variety of optical instruments and for allowing the operator to control the exposure, if necessary, by selectively overriding or modifying the automatic cycle of camera operation.

Preferably, the adapter includes mechanisms which allow the operator to selectively insert a delay into the automatic cycle.

In one mode of operation, the operator may insert a delay between the movement of the reflex member to the exposure position and the initiation of the film exposure phase. This allows any vibrations induced by the movement of the reflex member to damp out before film exposure is initiated.

In another mode of operation, the operator may insert an operator controlled delay into the film exposure phase for long time exposures, thereby overriding the timing circuit which limits the maximum exposure time for low-light level conditions.

Also the adapter may be used to manually control short exposures in situations where the photocell may provide erroneous readings.

In a preferred embodiment, the adapter is configured to mount the camera on the eyepiece tube of an optical instrument and includes an adjustable prismatic element for transmitting at least a portion of the light output of the instrument to the camera mounted photocell.

The adapter is provided with a manually operable shutter which is movable between positions blocking and unblocking the transmission of light from the eyepiece lens of the instrument to the camera lens and the prismatic element. The shutter mechanism also operates an auxiliary camera start switch on the adapter which is connected in parallel to the camera-mounted start switch through a camera cable release socket provided for that purpose.

The adapter shutter is normally located in and is biased towards the light-unblocking position. By means of a mechanical cable release connected to the adapter, the operator moves the adapter shutter to its light-blocking position. As the shutter moving mechanism approaches the end of its path of travel, it actuates the auxiliary switch thereby starting the automatic cycle of operation. The camera shutter closes, the reflex member pivots to the exposure position and the camera shutter reopens. However, exposure does not begin because the adapter shutter is blocking the objective lens and the light path to the photocell. The operator then waits as long as necessary for the vibrations to subside (generally 1 to 3 seconds) and manually releases the adapter shutter which moves to its normal unblocking position. Film exposure begins, and the interrupted automatic cycle of operation is resumed.

In order to insert a delay into the exposure phase for extended time exposures or, alternatively, for overriding the light-sensing circuit for manually controlled shorter exposures, the adapter also includes a mechanism which is operable to actuate a latch member on the camera body. Advantageously, the latch member also serves as part of a camera switch that is in series with a battery that powers the electronics of the camera. In operation, this device closes another auxiliary camera-start switch plugged into the cable release socket to begin the cycle of operation. When the camera is in the exposure phase, the device is then operable to move the latch member thereby disconnecting the battery from a cycle control circuit. At this point the automatic cycle is suspended thereby allowing the exposure to continue until the cycle is resumed by manually operating the device to move the latch switch into position to reenergize the control circuit.

Normally, this operation is conducted at low light levels which are insufficient for the light-sensing circuit to provide the exposure terminating trigger signal. Rather than waiting for the automatic timing circuit to terminate the exposure, the adapter preferably includes a small light bulb, positioned in front of the camera mounted photocell, which is operable to provide sufficient illumination for the light sensing circuit to cause exposure termination.

Therefore it is an object of the invention to provide an adapter for expanding the performance range of an automated camera by allowing the operator to selectively modify or override an automatic cycle of camera operation.

It is another object of the invention to provide an adapter for operatively coupling an automated single lens reflex camera to an optical instrument such as a microscope, telescope, etc. and for allowing the operator to selectively modify or override an automatic cycle of camera operation for the purpose of manually controlling the length of the exposure interval or inserting a delay in the sequence of camera operations to allow vibrations induced by the movement of a reflex member to subside before initiating a film exposure phase.

It is yet another object to provide such an adapter which includes a shutter for selectively blocking and unblocking the light transmission path from the eyepiece of the instrument to the camera objective lens and photocell for the purpose of inserting a delay in the automatic sequence of camera operation between the movement of a camera reflex member from a viewing and focusing position to an exposure position and the initiation of film exposure.

It is yet another object to provide an adapter for use with a battery operated camera having an automatic cycle of camera operation and including a switch member that is operable to disconnect the battery from an electronic circuit which controls the automated sequence of camera operation, said adapter including means for selectively operating the switch member to suspend and resume the cycle at the discretion of the operator.

Other objects of the invention will in part be obvious and will in part appear hereinafter.

BRIEF DESCRIPTION OF THE DRAWINGS

For a fuller understanding of the nature and the objects of the invention, reference should be had to the following detailed description taken in connection with the accompanying drawings wherein.

DESCRIPTION OF THE PREFERRED EMBODIMENT

Figure 1:
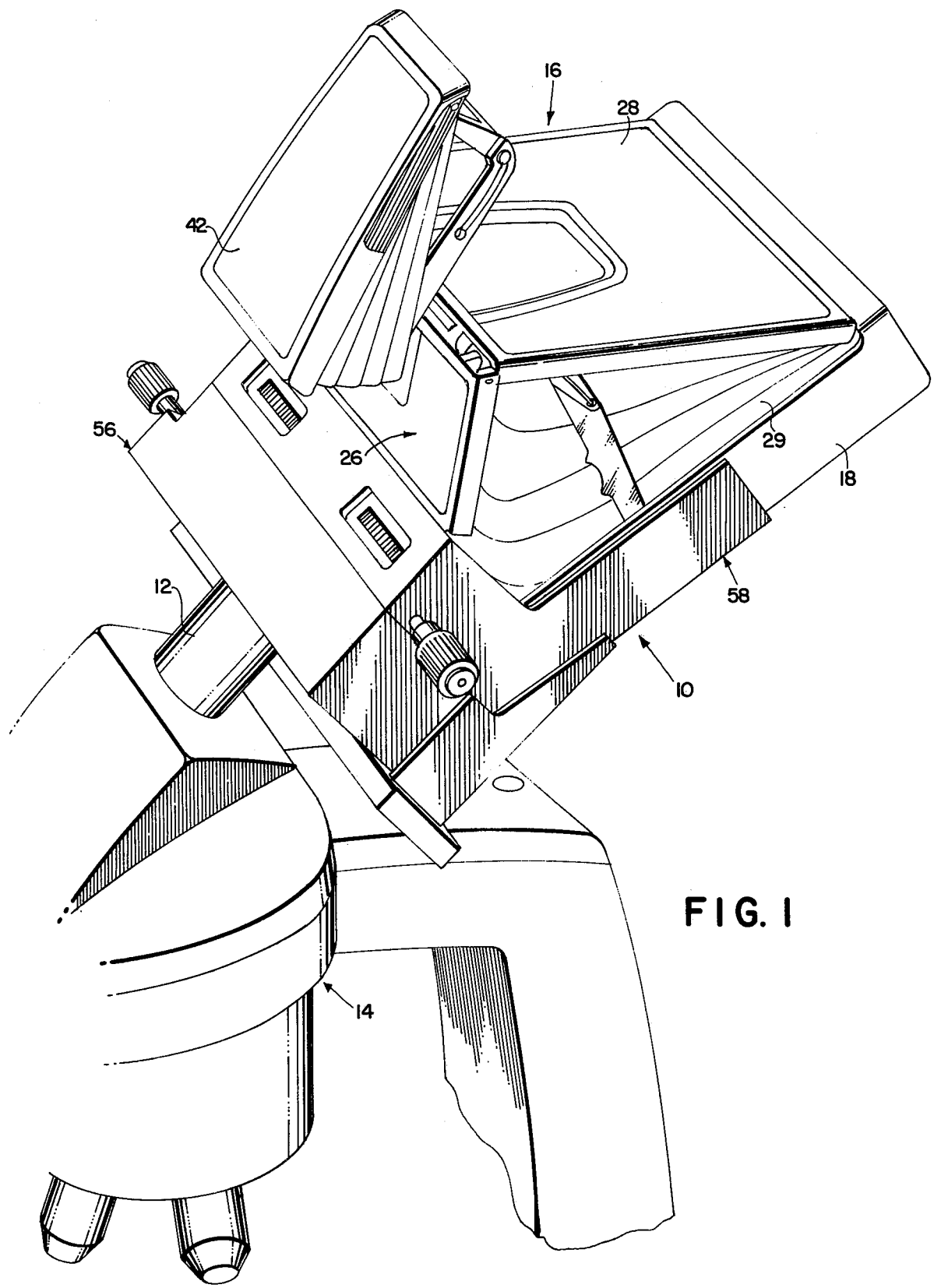
FIG. 1 is a perspective view of a battery-operated, automated, single lens reflex camera of the self developing type positioned in operative relation with the eyepiece lens of a microscope by means of an adapter embodying the instant invention.
Figure 2:
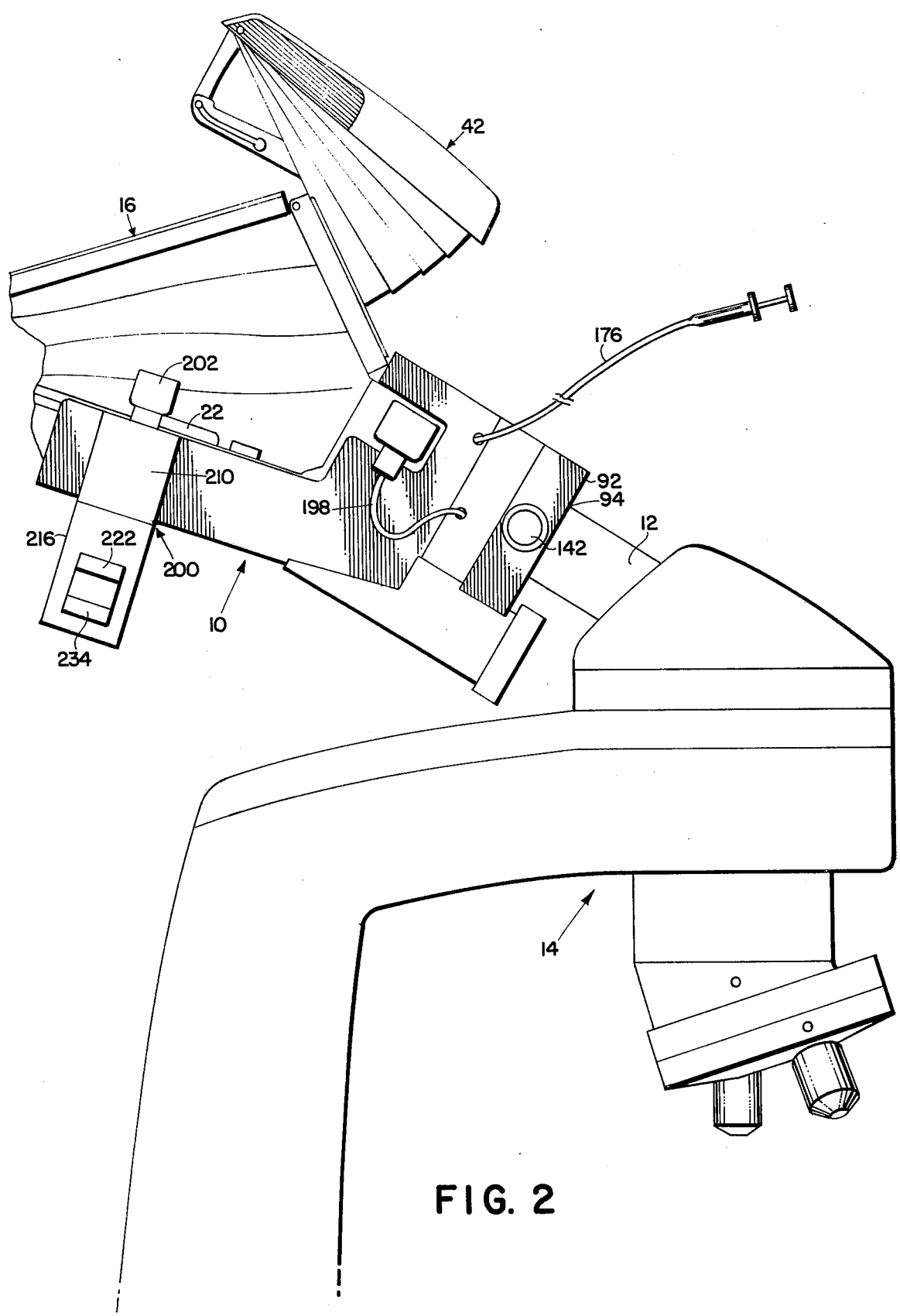
FIG. 2 is a perspective view of the opposite side of the apparatus shown in FIG. 1.

An adapter 10, embodying the novel features of the present invention, is shown in FIGS. 1 and 2 of the drawings mounted on an eyepiece tube 12 of a microscope 14 and supporting an SX-70 Land Camera 16 in operative relationship to the eyepiece lens of microscope 14. While the illustrated adapter 10 has been specifically designed for use with the SX-70 camera 16, it should be understood that the inventive concepts, to be described in detail hereinafter, will apply to other camera and adapter combinations as well as to the specific examples set forth in this disclosure.

In order to understand the operation of the adapter 10, it will be helpful, at this point, to provide a brief description of the illustrated camera 16.

Figure 9:
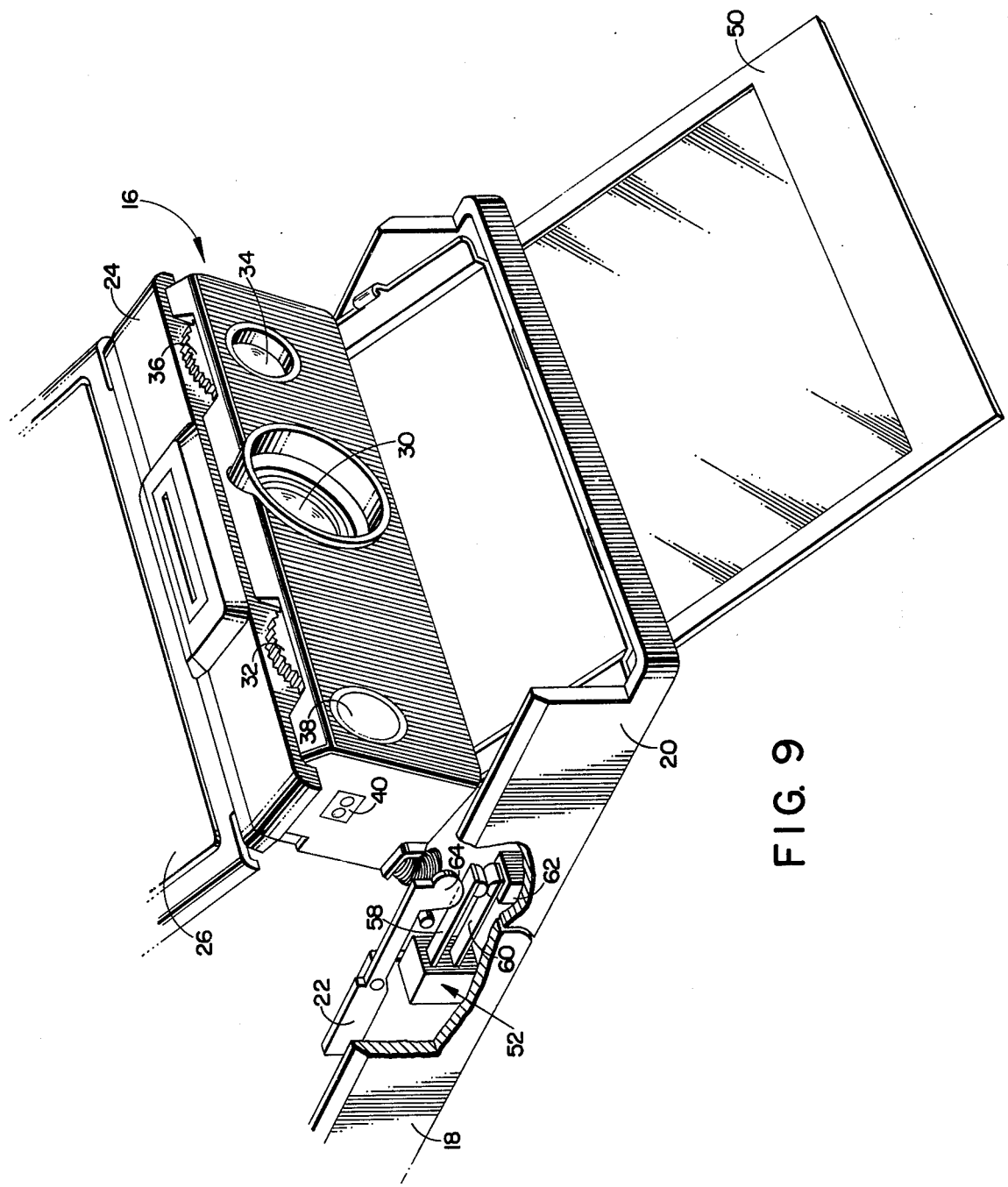
FIG. 9 is a perspective view, partly in section, of the forward portion of the camera shown in FIGS. 1 and 2 illustrating the details of a door latch switch which may be actuated by a mechanism on the adapter for disconnecting a battery located in the camera from a camera control circuit.

Camera 16 may be characterized as a compact, folding, battery operated, highly automated, single lens reflex camera of the self-developing type. As best shown in FIGS. 1, 2 and 9, it includes a base housing section 18 for receiving a film container holding a plurality of self-developing film units and, preferably, a flat battery for operating the electronic circuits of camera 16. Extending forwardly of housing section 18 is a pivotally mounted housing section 20 which mounts a pair of pressure applying rollers (not shown) for progressively applying a compressive pressure along the length of the film unit, subsequent to exposure, for distributing a fluid processing composition between predetermined layers of the film unit to initiate a development and diffusion transfer process.

Housing section 20 also serves as a film container loading door and is held in the closed position of FIG. 9 by a pivoting latch member 22 mounted on housing section 18. In order to load a film container into the base section 18, latch member 22 is pivoted (counter-clockwise as viewed in FIG. 9) to an unlatching position to allow the forward housing section 20 to pivot downwardly thereby providing access to a film container receiving chamber in housing section 18.

Positioned over housing section 18 are three pivotally interconnected housing sections 24, 26, and 28 and a light excluding bellows 29.

Housing section 24 mounts an adjustable focus objective lens 30 which may be axially displaced by means of a coupled focusing wheel 32. To the right of lens 30 is a photocell window 34 providing access for light transmission to a camera mounted photocell within housing section 24. As will be described later, the photocell forms part of a light sensing circuit for automatically controlling exposure. Positioned between the window 34 and the photocell is a variable density filter which may be adjustably positioned by means of a coupled filter wheel 36. Also mounted on housing section 24 is a camera cycle start button 38 and a cable release socket 40 for accepting an electrical switch actuated cable release.

An electronically controlled, two bladed, variable aperture shutter is positioned between a pair of adjacent elements of objective lens 30 and is normally in its open or light unblocking position for viewing and focusing. In the viewing and focusing mode, light rays pass through lens 30 and impinge upon an inclined mirror mounted on the interior surface of housing section 28. The mirror reflects the light downwardly towards the film exposure plane which is in coincidence with the forwardmost film unit in the film container held in the receiving chamber of housing section 18. In the viewing and focusing mode, however, the forwardmost film unit is covered by a plate-like reflex member having a Frennel-type viewing screen facing upwardly on the top side thereof and a mirror on the under side thereof, facing the forwardmost film unit. Light rays reflected from the mirror on the interior of housing section 28 form an image of the scene to be photographed on the viewing screen. The viewing screen is reflective and directs light rays emanating from the image back to the mirror on the interior of housing section 28 and through a aperture in housing section 26 to a viewing device 42 mounted thereon. A mirror in the viewing device 42 forms a second image of the scene which may be observed through an eye lens at the rear of device 42.

In operation, the user observes the scene or object to be photographed through viewing device 42 and adjusts objective lens 30 by means of focusing wheel 32 for sharp focus. To initiate a cycle of operation, the user actuates the camera start button 38 which closes a switch S1-A (see FIG. 8) to connect a battery 44 in the film container to a camera power and logic circuit 46. Power and logic circuit 46 is in turn connected to an automatic exposure control circuit 48 which includes a light sensing subcircuit of which the photocell is a part.

Once the power and logic circuit 46 is energized, the camera 16 proceeds through a preprogrammed automatic cycle of operation. The normally opened shutter closes. The reflex member is rapidly pivoted upwardly and is abruptly stopped in adjacent parallel relation to the inclined mirror on the interior surface of housing section 28 thereby uncovering the forwardmost film unit in the film container and positioning the mirror on the underside of the reflex member in alignment with the objective lens 30. The seating of the reflex member in the exposure position signals the end of a preexposure phase and the initiation of a film exposure phase under the control of the exposure control circuit 48.

The film exposure phase begins with the opening of the electronically controlled shutter. The length of the exposure interval, up to a preprogrammed limit of approximately 20 to 24 seconds, is determined by the light sensing circuit which is of the integrating type and provides a trigger signal for electronically closing the shutter when a predetermined amount of light has impinged upon the photocell. In response to the trigger signal, the shutter is moved to its light blocking position, thereby terminating the exposure interval.

The power and logic circuit 46 then proceeds through a post exposure mode of operation. During this stage, a film advance device advances the exposed forwardmost film unit from the film container and into the bite of the pair of pressure-applying rollers. The rollers are driven in a direction to cause the film unit to advance there-through and out of an exit slot in the bottom wall of housing section 20 as shown in FIG. 9. In this drawing, the ejected film unit is numerically designated 50. Simultaneously with the processing and ejection of the film unit, the reflex member is driven back to its viewing and focusing position, thereby light sealing the next film unit in the film container, and the power and logic circuit 46 causes the shutter to be reopened. At this point, all of the subsystems within the camera have been reset for the next cycle of operation and the automatic cycle is terminated.

Figure 8:
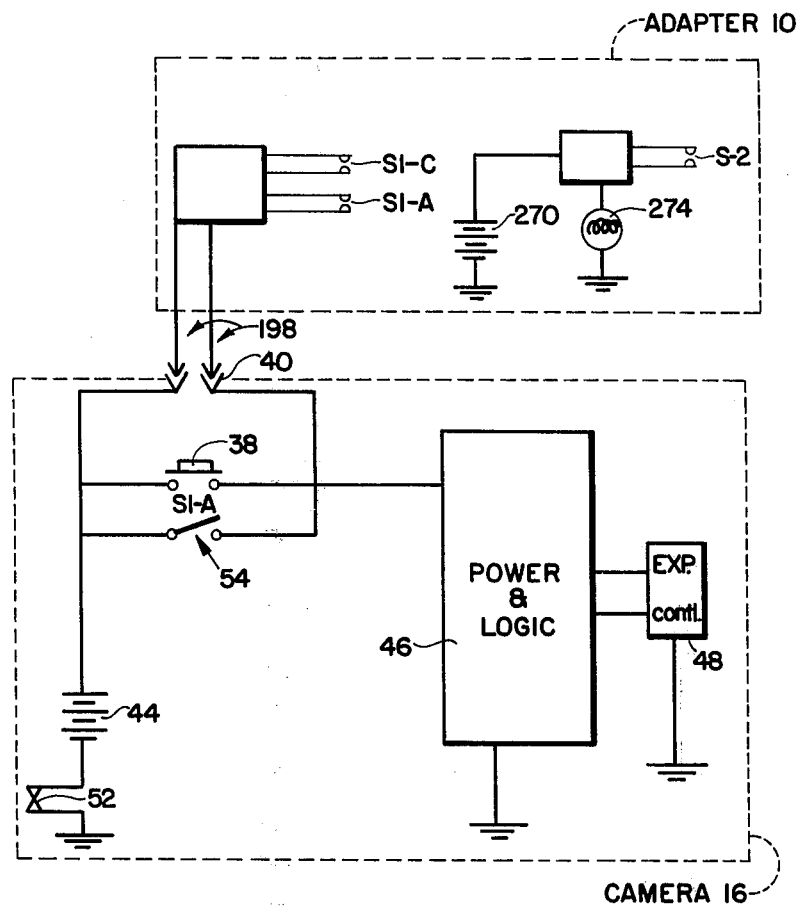
FIG. 8 is a diagrammatic representation of pertinent camera and adapter switches, devices and circuits.

From the diagram in FIG. 8 of the drawings, it will be seen that the cable release socket 40 is adapted to receive a plug and cable assembly having an auxiliary electrical switch which is connected in parallel to the camera start switch S1-A when the assembly is plugged into socket 40.

When a film container is initially loaded into the receiving chamber of camera 16, the forwardmost film unit is protected by a cardboard darkslide which must be ejected before the first film exposure can be made. Therefore, camera 16 is also preprogrammed for a darkslide eject mode of operation. As best shown in FIG. 8, there is an electrical switch 52 connected in series with the battery 44. Also, there is a switch member 54 connected in parallel to the camera start switch S1-A between battery 44 and circuit 46. If both switches 52 and 54 are closed (in a conducting state), the camera 16 will proceed through its automated cycle of operation just as if one had actuated swtich S1-A. Switch 52 is a sensing device which is closed only when housing section 20 is in its closed position and latch member 22 is in its latching position.

As best shown in FIG. 9, switch 52 is mounted on housing section 18 and includes a pair of spaced leaf-spring type contact arms 58 and 60 having contact points on the free ends thereof. Contact arms 58 and 60 extend across the interface of housing sections 18 and 20. Under a no load condition, the contact arms 58 and 60 space the contacts away from the conducting position shown in FIG. 9. In order to bring these contacts into the conduction position, a cam 62 is provided on housing section 20 such that it engages and urges the lower contact arm 60 upwardly when the housing section 20 is in its fully closed position. However, this condition alone is not enough to bring the two contacts to the conducting state. The upper contact arm 58 must be urged downwardly. This is accomplished by a cam member 64 positioned on the latching end of the pivotally mounted latch member 22. Cam member 64 will only provide the downward bias on contact arm 58 when the latch member 22 is in its latching position.

The switch 54 is also a sensing device and is actuated by a film counting device within camera 16. It is located in its conducting state only when the film counting device returns to its starting position indicating that the film container receiving chamber is empty.

In operation, the user unlatches housing section 20 to provide access for loading a film container. This causes switch 52 to assume its nonconducting or open condition. If the film chamber is empty, switch 54 is located in its conducting state. If there is an empty film container in the chamber, its removal causes the film counting device to rotate to the position wherein switch 54 is in the conducting state. A new film container is loaded into the chamber and switch 54 remains in its closed position. When the user closes and latches housing section 20, switch 52 is closed thereby completing the circuit to initiate the darkslide mode of operation. The camera proceeds through a normal cycle of operation and the darkslide is advanced from the film container, between the rollers, and out through the exit slot in the same manner as a film unit. During this first cycle of operation, the film counting device indexes one position thereby causing switch 54 to move to its nonconducting state. The camera is now ready for a film exposure cycle of operation initiated by the closing of switch S1-A or an auxiliary switch plugged into the cable release socket 40.

One skilled in the art will appreciate that the automatic cycle of operation may be suspended during the cycle by moving switch 52 to its nonconducting state to disconnect a battery 44 from the circuits 46 and 48. Also, it has been shown that the movement of the latch member 22 from its latching position to its unlatching position will cause switch 52 to open.

The preceding has been a brief description of the structure and operation of camera 16. For a detailed description, reference may be had to U.S. Pat. No. 3,774,516 issued on Nov. 27, 1973.

The body of the illustrated adapter 10 is formed by a forward body member 56 and a rear body member 58. In a preferred embodiment, both of these members may be of molded plastic construction although other materials are also suitable.

The rear body member 58 supports camera 16 and mounts a plurality of devices and mechanisms that cooperate with camera 16 to facilitate taking photographs through optical instruments. The forward member 56 is fixedly attached to member 58 and houses a mechanism for releasably securing adapter 10 to the eyepiece tube of an optical instrument.

Figure 3:
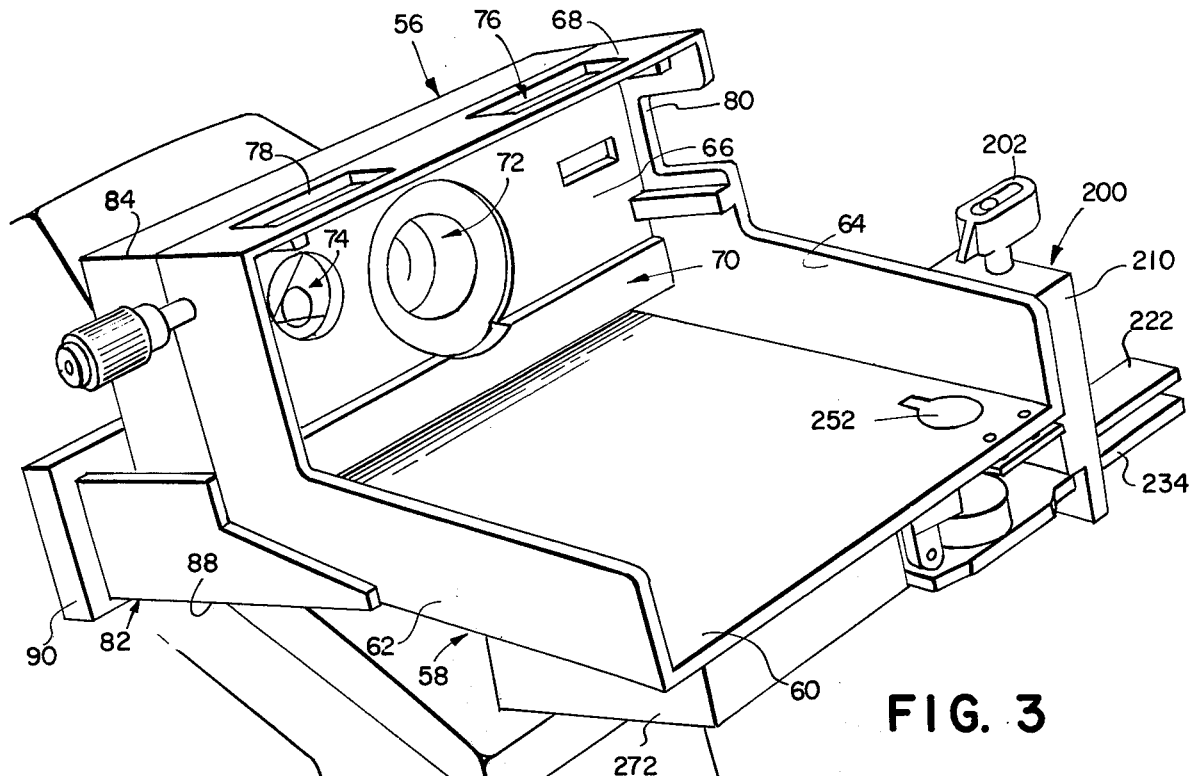
FIG. 3 is a perspective view of the adapter shown in FIGS. 1 and 2.

As best shown in FIG. 3, member 58 is defined by a generally planar bottom wall 60, lateral side walls 62 and 64, a forward wall 66, and a top wall 68 extending between side walls 62 and 64. The bottom edge of forward wall 66 is spaced from bottom wall 60 to define an opening 70 therebetween through which that portion of camera housing 20 forwardly of housing 24 extends when camera 16 is supported in adapter 10. Appropriate openings 72 and 74 are provided in forward wall 60 so as to be in alignment, respectively, with the camera lens 30 and the photocell window 34. Also, body member 58 includes aligned openings 76 and 78, in top wall 68, providing access for camera adjustment wheels 32 and 36, respectively, and a cutaway portion 80 in adapter side wall 64 for the camera cable release socket 40.

When the camera 16 is supported in adapter body member 58, as shown in FIGS. 1 and 2, the forward wall of camera housing 24 bears against the interior surface of adapter wall 66 and that portion of the bottom wall of camera housing section 20, extending rearwardly from the forward wall of camera housing section 24, and a portion of the bottom wall of camera housing section 18, extending rearwardly from the interface with housing section 20, are supported by the planar bottom wall 60. That portion of camera housing section 20 forwardly of the forward wall of housing section 24, including the film exit slot, extends through the opening 70 into the lower portion of adapter body member 56.

It is important to note that the bottom wall 60 of the adapter body member 58 extends across the interface between camera housing sections 18 and 24 and provides means for supporting the pivotally mounted housing section and loading door 20 in its closed position when an adapter mechanism (to be described later) is utilized to move the latch member 22 to its unlatching position to open camera switch 52.

Although not shown in the illustrated embodiment, adapter body member 58 may additionally include one or more camera engaging latches on clamps for securely connecting camera 18 to adapter 10.

Figure 4:
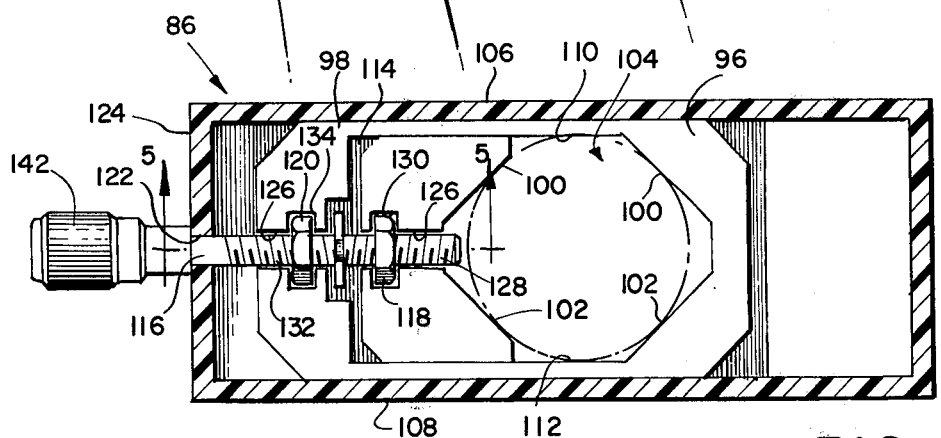
FIG. 4 is a sectional plan view of a forward section of the adapter showing the details of an adapter mechanism for gripping the eyepiece tube of an optical instrument for the purpose of mounting the adapter thereon.
Figure 5:
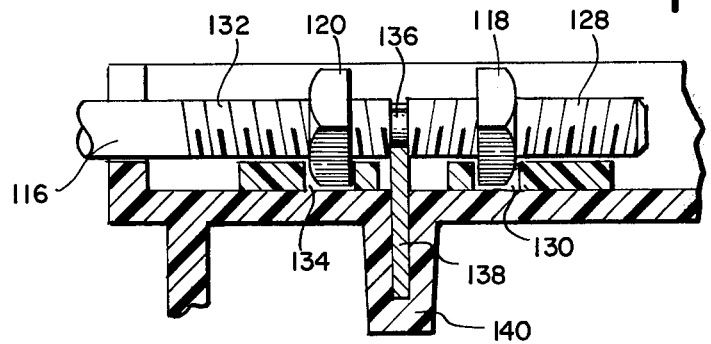
FIG. 5 is an enlarged sectional plan view of a portion of the device illustrated in FIG. 4 showing the details of a mechanism for adjusting the gripping device to the diameter of an eyepiece tube.

Adapter body member 56 includes a lower section 82 for receiving the leading end of camera housing section 20 and an upper housing section 84 enclosing an eyepiece tube gripping member 86 shown in FIG. 4 of the drawings.

The lower section 82 forms a hollow, open ended, forward extension of the adapter body section 58 in communication with opening 70 and its bottom wall 88 slopes downwardly (at approximately 15°) from the leading edge of wall 60 to provide clearance for the downwardly inclined path of travel of a film unit 50 being ejected from the camera film exit slot at the leading end of camera housing section 20.

Generally, the self-developing film units 50 used in camera 16 provide a positive image reflection print and have an integral light opacification system in the fluid processing composition which allows the film unit to be ejected from the camera directly into the ambient illumination without causing further exposure of the photosensitive materials therein. An example of such a film unit is disclosed in U.S. Pat. No. 3,415,644 issued to E. H. Land on Dec. 10, 1968. On occasion, however, another type of self-developing film unit, such as one providing a transparency, may be employed which requires a short imbibition period, following distribution of the processing fluid, in a light-free environment to prevent further exposure of its photosensitive materials. To provide such a light-free environment, a forwardly extending light opaque flexible bag or envelope may be attached to the open leading end of adapter section 82. As best shown in FIGS. 1, 2, and 3, a generally rectangular flange 90 is provided around the open leading end of adapter section 82 to facilitate the attachment of the light opaque bag or envelope. Examples of self-developing film units which provide a transparency may be found in U.S. Pat. Nos. 2,861,885 and 3,615,426.

The upper housing section 84 of body member 56 includes a forward wall 92 having an opening 94 therein, in alignment with the opening 72 in wall 66, through which the eyepiece tube of an optical instrument, e.g., eye-piece tube 12 of microscope 14, extends into housing section 84. Although not shown in the drawings, a seating member for the mounting ring of the instrument eye lens is provided within housing section 84 for locating the eye lens in predetermined axial spaced alignment with the objective lens 30 of the camera 16 supported in adapter 10.

The eyepiece tube gripping mechanism 86, is a vise-like device having first and second tube gripping members 96 and 98 mounted behind the forward wall 94 of housing section 84 in substantially parallel relation thereto for sliding movement in opposite directions relative to one another. Gripping members 96 and 98 each include a pair of oppositely inclined upper and lower tube engaging surfaces 100 and 102, respectively, which define, in part, a variable aperture 104 having a central axis that remains in alignment with the common axis of openings 94 and 72 as the gripping members 96 and 98 are moved relative to one another to vary the size of aperture 104.

The first gripping member 96 is dimensioned to slide between the interior surfaces of top and bottom walls 106 and 108, respectively, of adapter housing section 84. The second gripping member 98, fits between upper and lower guide surfaces 110 and 112 in member 96 which define, in part, an aperture 114 for receiving member 98.

The means for moving members 96 and 98 relative to one another including a rotatably mounted threaded shaft 116 having gripping member drive nuts 118 and 120 threaded thereon for movement in opposite directions, when shaft 116 is rotated.

Shaft 116 extends into housing section 84 through an opening 122 in a side wall 124 thereof and passes through a pair of aligned openings 126 in members 96 and 98. A right-hand threaded section 128 of shaft 116, having nut 118 thereon, extends through member 96 with nut 118 being captured in a rectangular opening 130 therein. Nut 120 is threaded on a left-hand threaded section 132 of shaft 116 and is captured in a rectangular opening 134 in gripping member 98. An unthreaded portion 136 of shaft 116, between sections 128 and 134, is rotatably supported in a bearing 138 which is fixedly mounted on a bearing support member 140 in housing section 84.

Shaft 116 is manually rotated by means of a handle 142 on the exterior end thereof. Since shaft 116 is captured in bearing 138, there is no axial motion of the shaft 116 relative to housing section 84. Instead the gripping member drive nuts 118 and 120 are advanced along the threaded sections 128 and 132, in opposite directions, moving the gripping member 96 and 98 along therewith in a push-pull relationship. In this manner, the tube engaging gripping surfaces 100 and 102 of members 96 and 98 may be adjusted to fit eyepiece tubes of various diameters.

Adapter 10 also includes means for diverting at least a portion of the light output of the optical instrument to the photocell window 34 of camera 16 to provide the necessary light input for automatic exposure under the control of the camera light sensing circuit.

In a preferred embodiment, the light diverting means includes a prismatic element 144 (See FIG. 6) which is mounted on the exterior side of adapter wall 66 (facing housing 84) for translational movement relative to the optic axis of the eypiece lens of the optical instrument and the aligned optic axis of the camera objective lens 30 such that an input end or surface 146 of element 144 may extend into the cone of light emanating from the instrument eye lens and cause a portion of the scene light to be transmitted through element 144 to an output end 148 thereof positioned in front of the opening 74 in wall 66 that is in alignment with the photocell window 34.

Prismatic element 144 is preferably of molded plastic construction and includes an integrally molded extension 150 thereon which serves to couple element 144 to a horizontal guide channel or track 152 on the forward side of adapter wall 66 over opening 72 therein. Extension 150 also serves to couple element 144 to one end of a shaft 154 of a prism positioning mechanism 156 which is operable to adjust the lateral disposition of element 144 with respect to opening 72. The opposite end of shaft 154 is finely threaded and is coupled to a complementary threaded coupling 158 on side wall 62 of adapter. A handle 160 on the outboard threaded end of shaft 154 may include suitable markings thereon which may be used in conjunction with a scale on coupling 158 to provide accurate and repeatable adjustment of the position of element 144 relative to opening 72.

Figure 6:
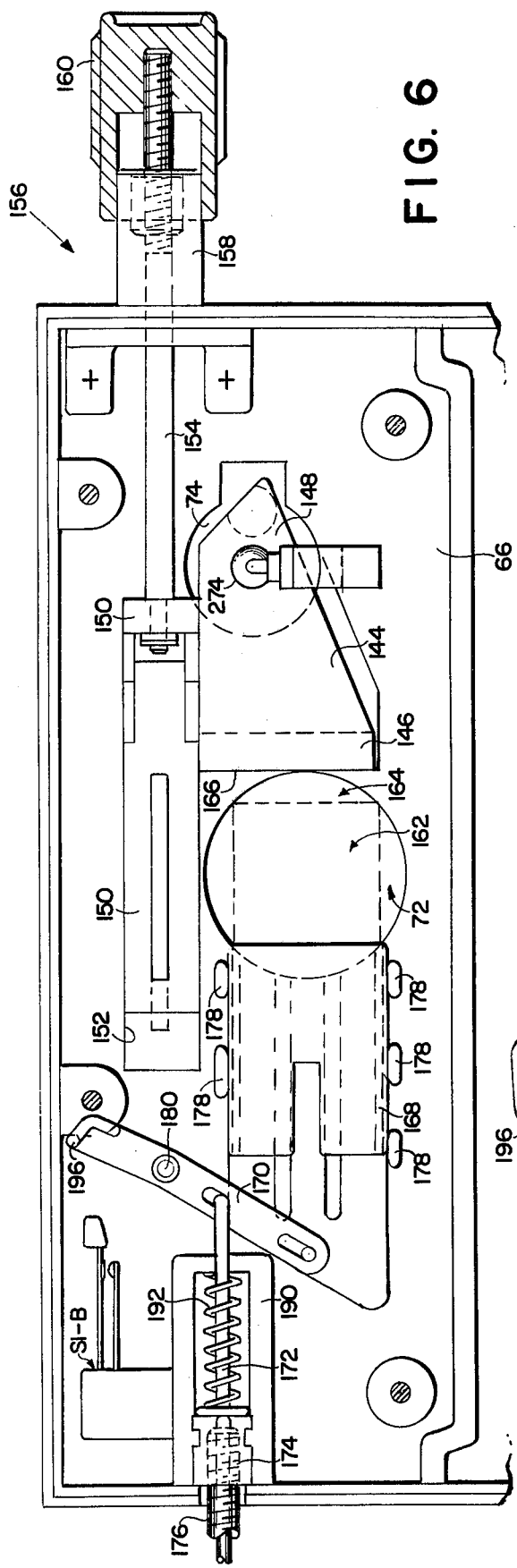
FIG. 6 is a front elevational view of a section of the adapter showing an adapter shutter in its normal light-unblocking position and a moveably mounted prismatic element for transmitting a portion of the light output of the optical instrument to a camera mounted photocell.

The circular opening 72 in wall 66 fairly approximates the cross section of the cone of image bearing light transmitted from the eye lens of the optical instrument to the objective lens 30 of camera 16. As shown in FIG. 6, the cone of light circumscribes the rectangular or square image forming area 162 (shown in dotted lines) of a film unit 50 at the exposure plane. In order to divert a portion of the available light output of the optical instrument to the photocell without diminishing the intensity of light output available for film exposure, the input surface 146 of prismatic element 144 is positioned over the right hand edge of opening 72 to intercept light rays in the chordal segment 164 of the circular cross section outside the bounds of the image-forming area 162.

In operation, the user observes the image provided by the eye lens of the optical instrument through the viewing system of camera 16 and moves element 144 to the left (as viewed in FIG. 6) to bring the input surface 146 thereof into overlapping relationship to right-hand portion of opening 72 until the leading edge 166 of element 144 or a shadow formed thereby, is visible at the corresponding lateral edge of the viewfinder format. The prismatic element 144 is then backed off slightly (moved to the right) until the leading edge 160 is no longer visible thereby positioning the input surface 146 of element 144 in alignment with chordal segment 164.

A more detailed description of prismatic element 144 may be found in copending applications Ser. Nos. 420,913 and 420,915, filed on Dec. 3, 1973 (now U.S. Pat. Nos. 3,900,858 and 3,898,678 respectively).

As noted earlier it has been found that when the adapter 10 is attached to an eyepiece tube of rather light construction, vibrations are induced in the camera/instrument system by the movement of the reflex member from the viewing position to the exposure position. These vibrations may persist to 1 to 3 seconds and if the exposure interval is relatively short, image blur results. Therefore, adapter 10 includes means for inserting a delay into the automatic cycle of camera operation for allowing the vibrations to subside prior to initiation of the exposure phase.

The delay isoinduced optically by selectively blocking and unblocking the light path from the eye lens of the instrument to the camera objective lens 30 and the input surface 146 of prismatic element 144 (thereby preventing light transmission from the chordal segment 164 to the photocell window 34).

Figure 7:
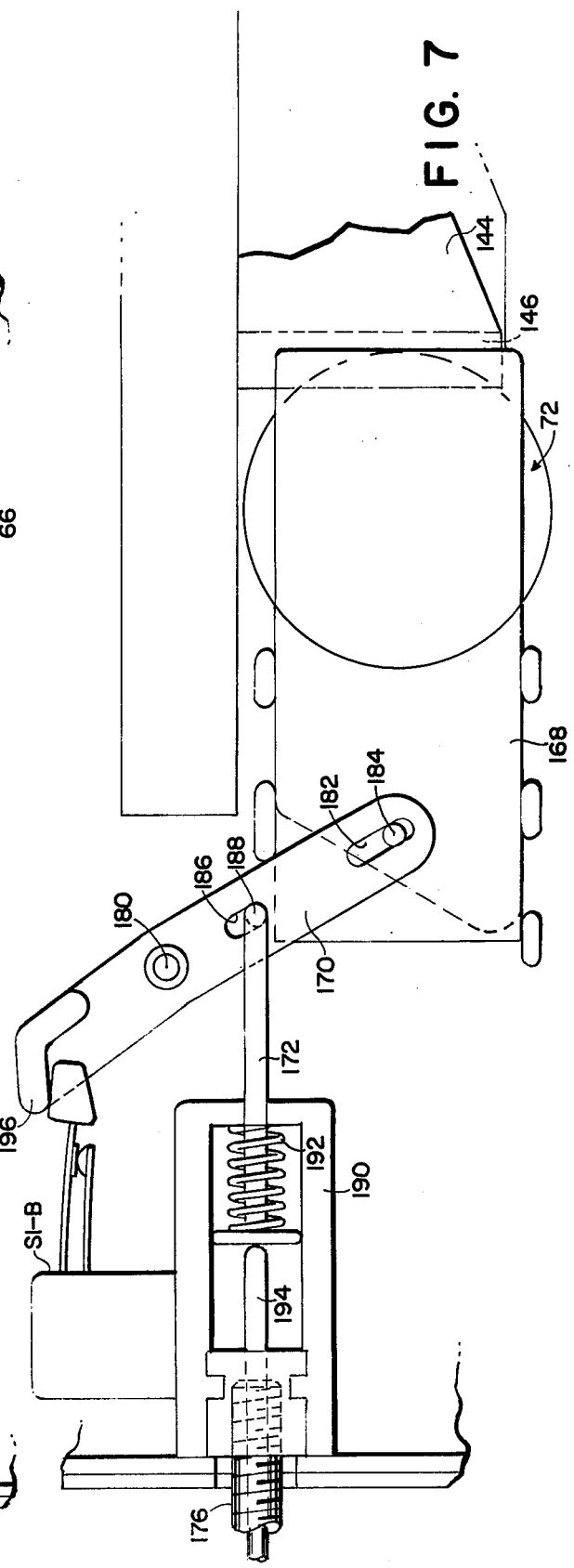
FIG. 7 is an enlarged elevational view of a portion of FIG. 6 showing the adapter shutter mechanism in its light-blocking position.

As best shown in FIGS. 6 and 7, adapter 10 includes shutter mechanism comprising a shutter blade 168, a pivot arm 170 for moving blade 168, a pivot arm drive piston 172 for moving arm 170, and a cable release socket 174 for receiving a mechanical cable release 176 for actuating drive piston 172.

Shutter blade 168 is mounted between spaced horizontal guide members 178 on wall 66 for sliding motion between the light unblocking position of FIG. 6 wherein the leading end of the blade 168 overlies the left-hand edge of opening 72 but does not intrude into image recording area 162, and the light blocking position of FIG. 7 wherein blade 168 completely covers opening 72 and the light input surface 146 of element 144 located in the path of chordal segment 164.

Pivot arm 170 is pivotally mounted on wall 66 at pin 180. Theolower end of arm 170 has an elongated slot 182 therein for receiving a pin 184 on shutter blade 168. Intermediate pin 180 and slot 182 is a slot 186 for receiving a drive pin 188 on the end of drive piston 172.

Piston 172 is located in a piston housing 190 on wall 66 and is biased towards the unblocking position of FIG. 6 by helical spring 192. When cable release 176 is screwed into socket 174, a retracted plunger 194 thereof is located in position to drive piston 170 from the unblocking position of FIG. 6 to the blocking position of FIG. 7.

Mounted on wall 66 in the path of travel of the upper end 196 of pivot arm 170 is normally open electrical switch S1-B that is connected by a cable and plug assembly 198 to the cable release socket 40 of camera 10.

In operation, shutter blade 168 is located in the unblocking position of FIG. 6. The operator focuses lens 30 and adjusts the position of prismatic element 144 as previously described.

Cable release 176 is actuated and plunger 194 drives piston 172 forwardly (to the right as viewed in FIGS. 6 and 7) causing pivot arm 170 to rotate about pin 180 in a counter-clockwise direction to move shutter blade 168 to the light blocking position of FIG. 7. As the leading edge of blade 168 covers the input surface 146 of element 144, the upper end 196 of arm 170 engages an extension on the upper leaf spring contact of switch S1-B and closes this normally open switch to initiate the automatic cycle of camera operation.

The camera reflex member moves to the exposure position but film exposure and light sensing by the photocell do not begin because of the light blocking action of the closed shutter blade 168. The operator waits the required 1 to 3 seconds for the vibrations to subside and then releases the mechanical cable release 176 causing the shutter blade 168 to open, under the influence of spring 192, to initiate film exposure and light sensing. The automatic cycle then proceeds until termination.

It will be noted that switch S1-B is opened when shutter blade 168 is moved to the unblocking position. This however does not interrupt the cycle because power is automatically latched onto the camera control circuits after the initial closing of switch S-1B.

By use of the above-described mechanism, the operator may induce a delay into the operating cycle between movement of the reflex member and the initiation of film exposure and light sensing. However, the delay is limited by the automatic timing circuit that terminates exposure at the 20 to 24 second time limit. Therefore the above described mechanism is useful for making vibration free exposures of up to approximately 15 seconds.

The shutter mechanism may also be used to make short manually controlled exposures where the nature of the object being observed through the optical instrument or the lighting conditions might cause the photocell to provide an erroneous reading. In this instance, the prismatic element 144 is backed off sufficiently so that it does not intercept any scene light. The shutter blade 168 is moved to the blocking position to initiate a cycle of operation and after the vibrations subside, blade 168 is opened to initiate exposure. The operator times the exposure interval and terminates exposure by once again moving the shutter blade 168 to the light-blocking position. The second closure of S1-B has no effect on the cycle. Blade 168 is held in the closed position until the automatic cycle is once again resumed by the timing circuit. Alternatively a small light bulb may be positioned within adapter 10 in front of element 144 and in alignment with the opening 74 which upon manual actuation will cause the light sensing circuit to provide the required trigger signal for resuming the interrupted cycle.

For making relatively long exposures, adapter 10 includes a mechanism 200 for inserting a time delay, which may be as long as the operator desires, into the exposure phase. This delay is induced electrically by depressing the camera latch mechanism 22 to electrically open switch 52. When switch 52 is opened during the exposure phase, battery 44 is disconnected from the camera power and logic circuit 46 causing the automatic cycle of operation to be suspended until switch 52 is closed once again.

Figure 10:
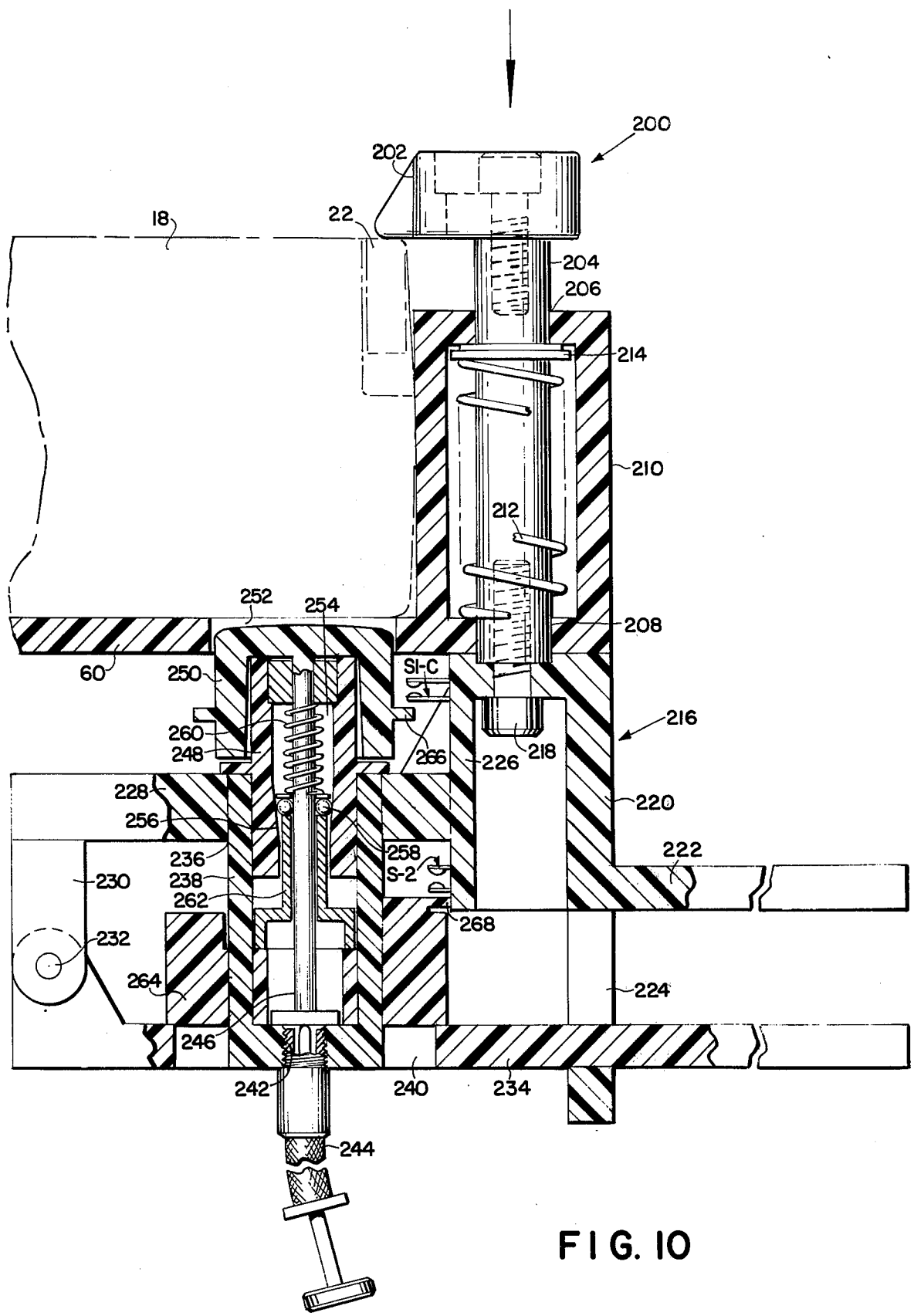
FIG. 10 is a sectional view of the adapter mechanism for actuating the door latch switch.

The mechanism 200, as best shown in FIGS. 2, 3, and 10, is mounted on the exterior of adapter side wall 64 and includes a latch depressing or actuating arm 202 which may be moved into overlying relationship to the latch member 22 of a camera 10 held in adapter 10.

Arm 202 is secured to the top end of a cylindrical shaft 204 that extends through top and bottom openings 206 and 208, respectfully, of a generally parallel-epiped shaped hollow housing section 210. Shaft 204 is spring biased upwardly by a helical spring 212 which bears against a fixed locating collar 214 on shaft 204.

The lower end of housing section 210 terminates at the bottom wall 60 of adapter 10 and positioned therebelow is a second housing section 216 which is secured to the lower end of shaft 204 by a screw 218.

Housing section 216 includes a vertically depending rigid exterior wall 220 having an integrally formed outwardly extending (to the right as viewed in FIG. 10) arm 222 thereon. Located below arm 222 is a generally rectangular opening 224 in wall 220. An interior wall 226 of housing 216 includes thereon an inwardly extending integrally formed rigid arm 228 which has a vertically depending portion 230 at the free end thereof. Pivotally coupled to portion 230 at pin 232 is a rigid release actuating member or arm 234 which extends through the opening 224 in wall 220 in generally parallel relation to arm 222.

Fixedly secured to inwardly extending arm 228 and depending through an opening 236 therein is a hollow cylindrical member 238 that extends down through an opening 240 in the lower release actuating arm 234. The bottom of member 238 has a central threaded coupling 242 therein for receiving a standard mechanical cable release 244. Located within cylinder 238 is a piston rod 246 which extends into a fixed sleeve 248 in the upper end of cylinder 228. Mounted on the upper end of rod 246 is a piston head 250 which is in alignment with an opening 252 in the bottom wall 60 of adapter 10.

The central bore 254 of sleeve 248 has a convergent tapered section 256 into which a plurality of locking balls 258 are urged by a spring 260 on rod 246 to frictionally secure rod 246 to the insert sleeve 248. A lock releasing collar 262 on rod 246 extends into the central bore 254 and is effective, when moved upwardly, to move the locking balls 258 upwardly off the convergent section 256 thereby breaking the friction connection and allowing relative movement between rod 246 and sleeve 248. Releasing collar 262 is movable by means of an annular actuating member 264 that extends through vertical slots in cylinder 238. Member 264 extends outwardly beyond the circumference of opening 240 in release actuating arm 234 and is moved upwardly thereby when arm 234 is pivoted in a counterclockwise direction about pin 232.

Mechanism 200 also includes a normally open auxiliary camera cycle start switch S1-C positioned in the path of travel of an outwardly extending tab 266 on piston head 250. Switch S1-C is connected in parallel with S1-B and is coupled to the camera cable release socket 40 by by the cable and plug assembly 198. A second normally open switch S-2 is located in the path of travel of an extension 268 on annular actuator 264. As best shown in FIGS. 6 and 8, switch S-2 is connected between an adapter battery 270 (housing in a depending storage compartment 272 underlying adapter bottom wall 60) and a small light bulb 274 mounted on forward wall 66 in front of element 144 and in alignment with opening 74 in front of the camera photocell window 34.

In operation, the plunger of cable release 244 is depressed, driving piston rod 246 and piston head 250 upwardly. The locking balls 258 act like a one-way clutch allowing upward movement of rod 246 in sleeve 248 but not downward movement. As the piston head 250 travels through opening 252 and into engagement with the underside of camera 10, the tab 266 engages and closed switch S1-C thereby initiating a cycle of camera operation. The reflex member moves to the exposure position and the shutter reopens to initiate film exposure.

In this mode of operation, the prismatic element 144 is backed off from its operative position since the light sensing circuit is not utilized for controlling the exposure interval.

With piston head 250 firmly seated against the underside of camera 10, further depression of the cable release plunger causes cylindrical member 238 to move downwardly relative to the bottom wall 60 of adapter 10 thereby driving the rigid arm 228, housing 220, shaft 204 and the latch actuating arm 202 downwardly therewith to cause the camera door latch 22 to be moved to its unlatching position to open switch 52. This disconnects battery 44 from camera power and logic circuit 246 and suspends the The automatic cycle of operation. Film exposure continues until switch 52 is once again closed and the exposure phase is terminated.

Once the mechanism 200 has been actuated to depress latch arm 22, the cable release 244 may be released since it is not utilized to release mechanism 200.

The operator manually times the exposure interval and at the appropriate moment releases mechanism 200 by pivoting release arm 234 upwardly towards arm 222. In practice the operator may grasp the ends of arm 222 and 234 and apply a squeezing action to accomplish this function.

The pivotal motion of arm 234 drives annular release member 264 upwardly causing the extension 268 thereon to close switch S-2 and light bulb 274. Release member 264 in turn drives collar 262 upwardly displacing the locking balls 258 from the tapered constriction 256 thereby breaking the frictional connection between rod 246 and sleeve 248. This releases the static forces that hold mechanism 200 in the latch switch depressing position and arm 228, housing section 216, shaft 204 and actuating arm 202 return to their respective normal positions under the influence of spring 212. Latch member 22 is moved to its latching position thereby closing switch 52 to reenergize circuit 46. The light bulb 274 provides sufficient illumination to cause the light sensing circuit to render the required trigger signal to terminate the exposure mode and initiate the film processing mode.

Mechanism 200 is designed primarily for making relatively long time exposures. It may be used, however, to make shorter exposures under conditions where the camera photocell may provide erroneous readings. But since mechanism 200 inserts the delay during the exposure phase rather than between movement of the reflex member and the initiation of exposure, the induced vibrations will persist into the beginning of the exposure phase. Therefore, mechanism 200 should only be used for making exposures of more than approximately 15 seconds.

In a preferred embodiment of adapter 10, the depending housing 272 on the underside of adapter wall 60 may include a threaded coupling on the bottom wall thereof for mounting the adapter 10 on a tripod in the event that the eyepiece tube of a particular optical instrument is too delicate to support the weight of camera 16.

While the illustrated adapter 10 includes both the auxiliary shutter mechanism and the door latch depressing mechanism, it is within the scope of the present invention to provide an adapter that includes only one or the other to these two mechanisms. Also, in an alternative embodiment, the forward housing section 84 with the tube gripping device 86 therein may be designed to be easily removed from the front of the adapter so the adapter may be used for making operator controlled exposures of subjects other than images provided by the eye lens of an optical instrument.

Since certain changes may be made in the above adapter without departing from the scope of the invention herein involved, it is intended that all matter contained in the above description or shown in the accompanying drawings shall be interpreted as illustrative and not in a limiting sense.

What is claimed is:

1. An adapter for operatively coupling an automated camera to an optical instrument for the purpose of photographing an image provided by the instrument and for selectively modifying a preprogrammed cycle of camera operation to facilitate taking such photographs, the automated camera being of the type which upon actuation automatically proceeds through a cycle of operation that includes a pre-exposure phase during which a reflex member moves from an initial position to an exposure position, followed by an exposure phase, under the control of a light sensing circuit formed in part by a camera mounted photocell, during which a shutter operates to allow image-bearing light received by the camera objective lens to expose a film unit within the camera, the length of the exposure interval being determined by the intensity of the image-bearing light incident upon the photocell, the exposure phase being followed by a post exposure phase during which the reflex member moves back to the initial position, followed by termination of the cycle, said adapter comprising an adapter body including means for receiving and supporting such an automated camera thereon;
means for coupling said adapter body to an optical instrument such that the objective lens of the camera supported thereon is operatively positioned to receive image-bearing light provided by the instrument; and
means on said adapter body for inserting a user controlled delay into the automatic cycle of camera operation between the pre-exposure and film exposure phases for allowing vibrations induced by the movement of the reflex member during the pre-exposure phase to subside prior to the initiation of film exposure.

2. An adapter as defined in claim 1 wherein said adapter is configured for use with an optical instrument of the type wherein the image-bearing light emanates from an eye lens mounted on an eye lens tube and said means for coupling said adapter body to the optical instruments includes means for gripping the eye lens tube about its periphery.

3. An adapter as defined in claim 2 wherein said gripping means is adjustable for accommodating eye lens tubes of various diameters.

4. An adapter as defined in claim 1 further including means for diverting a portion of the image-bearing light provided by the optical instrument to the camera mounted photocell to serve as an input for the exposure interval controlling light sensing circuit, said means for diverting a portion of the image-bearing light to the photocell including a prismatic element having an input surface for receiving the portion of image-bearing light from the optical instrument and an output surface positioned in alignment with the photocell for transmitting the image-bearing light thereto.

5. An adapter as defined in claim 4 further including means for adjusting the position of said prismatic element relative to a cone of image-bearing light emanating from the optical instrument.

6. An adapter as defined in claim 1 wherein the automated camera is battery operated and includes a timing circuit for providing an exposure terminating signal at the end of a predetermined exposure interval when the intensity of image-bearing light incident upon the photocell is insufficient to cause exposure termination within said predetermined interval and the camera also includes an electrical switch that is operative by moving a latch member on the camera to disconnect the battery from a cycle power and control circuit and said adapter further includes means for actuating the latch member to disconnect the battery during the exposure phase to suspend the automatic cycle of camera operation for the purpose of making extended time exposures which exceed the predetermined interval in duration, said actuating means being operable to once again connect the battery to resume operation of the suspended cycle of operation.

7. An adapter for use with an automated, battery operated camera of the type which upon actuation proceeds through an automatic cycle of camera operation including a film exposure phase under the control of a light sensing circuit formed in part by a camera mounted photocell, the exposure interval being determined by the intensity of scene light incident upon the photocell, the camera further including a timing circuit that provides an exposure terminating signal at the end of a predetermined exposure interval when the intensity of light incident upon the photocell is insufficient to cause exposure termination within said predetermined interval, the camera also including an electrical switch that is operative by moving a latching member on the exterior of the camera from a latching position to an unlatching position for disconnecting a battery from a camera cycle power and control circuit, said adapter comprising:
- an adapter body including means for receiving and supporting such an automated battery operated camera thereon;
- means on said adapter body being operable to actuate a cycle of camera operation;
- means on said adapter body for moving the latching member from the latching position to the unlatching position during the exposure phase for disconnecting the battery and thereby overriding the exposure terminating timing circuit for the purpose of making extended time exposures which are longer in duration than the predetermined interval and for moving the latching member back to the latching position once again to connect the battery and resume the cycle of operation; and
- means for operating said camera actuating means and said latch moving means in a coordinated manner.

8. An adapter as defined in claim 7 further including a light bulb positioned in front of the camera photocell and being operative to provide a light input to the light sensing circuit when energized after the automatic cycle has been resumed for the purpose of terminating the exposure phase of the automatic cycle of operation.

9. An adapter as defined in claim 7 wherein the camera latching member releasably secures one camera housing section to another camera housing section when the latching member is located in the latching position and said adapter further includes means for maintaining both housing sections in their operative relationship when the latching member is moved to its unlatching position.

10. An adapter as defined in claim 9 further including means for releasably securing said adapter body to an optical instrument for operatively coupling the camera to the optical instrument for the purpose of photographing an image provided by the instrument.

11. An adapter as defined in claim 7 wherein said means for operating said camera actuating means and said latch moving means is configured to be actuated by a mechanical cable release and said adapter further includes a coupling member for receiving and supporting such a cable release.

12. An adapter for operatively coupling an automated camera to an optical instrument for the purpose of photographing an image provided by the instrument and for selectively modifying a preprogrammed cycle of camera operation to facilitate taking such photographs, the automated camera being of the type which upon actuation automatically proceeds through a cycle of operation that includes a pre-exposure phase during which a reflex member moves from an initial position to an exposure position, followed by an exposure phase, under the control of a light sensing circuit formed in part by a camera mounted photocell, during which a shutter operates to allow image-bearing light received by the camera objective lens to expose a film unit within the camera, the length of the exposure interval being determined by the intensity of the image-bearing light incident upon the photocell, the exposure phase being followed by a post exposure phase during which the reflex member moves back to the initial position, followed by termination of the cycle, said adapter comprising:
- an adapter body including means for receiving and supporting such an automated camera thereon;
- means for coupling said adapter body to an optical instrument such that the objective lens of the camera supported thereon is operatively positioned to receive image-bearing light provided by the instrument;
- means for diverting a portion of the image-bearing light provided by the optical instrument to the camera mounted photocell to serve as an input for the exposure interval controlling light sensing circuit; and
- means for inserting a delay into the automatic cycle of camera operation between the pre-exposure and film exposure phases for allowing vibrations induced by the movement of the reflex member during the pre-exposure phase to subside prior to the initiation of film exposure, said means for inserting the delay including means for selectively blocking and unblocking the transmission of image-bearing light provided by the instrument to the camera objective lens and said light diverting means.

13. An adapter for operatively coupling an automated camera to an optical instrument for the purpose of photographing an image provided by the instrument and for selectively modifying a preprogrammed cycle of camera operation to facilitate taking such photographs, the automated camera being of the type which upon actuation automatically proceeds through a cycle of operation that includes a pre-exposure phase during which a reflex member moves from an initial position to an exposure position, followed by an exposure phase, under the control of a light sensing circuit formed in part by a camera mounted photocell, during which a shutter operates to allow image-bearing light received by the camera objective lens to expose a film unit within the camera, the length of the exposure interval being determined by the intensity of the image-bearing light incident upon the photocell, the exposure phase being followed by a post exposure phase during which the reflex member moves back to the initial position, followed by termination of the cycle, said adapter comprising:
- an adapter body including means for receiving and supporting such an automated camera thereon;
- means for coupling said adapter body to an optical instrument such that the objective lens of the camera supported thereon is operatively positioned to receive image-bearing light provided by the instrument;

means for diverting a portion of the image-bearing light provided by the optical instrument to the camera mounted photocell to serve as an input for the exposure interval controlling light sensing circuit; and means for inserting a delay into the automatic cycle of camera operation between the pre-exposure and film exposure phases for allowing vibrations induced by the movement of the reflex member during the pre-exposure phase to subside prior to the initiation of film exposure, said means for inserting the delay including a shutter mounted on said adapter body for movement between positions blocking and unblocking the transmission of image-bearing light provided by the optical instrument to the camera objective lens and said light diverting means, said shutter being adapted to be located in said blocking position when the automatic cycle of camera operation is initiated thereby allowing the camera to proceed through the pre-exposure phase but inhibiting the initiation of the film exposure phase by preventing transmission of light through the objective lens to the film unit and blocking the input to the light sensing circuit, said shutter thereafter being movable from said blocking position to said unblocking position to initiate the film exposure phase.

14. An adapter as defined in claim 13 further including means for biasing said shutter towards said unblocking position and means being actuable for moving said shutter from said unblocking position to said blocking position.

15. An adapter as defined in claim 14 further including means for actuating a cycle of camera operation in response to moving said shutter from said unblocking position to said blocking position.

16. An adapter as defined in claim 15 wherein said shutter moving means is adapted to be actuated by a mechanical cable release and said adapter further includes a coupling to which such a cable release may be connected to locate the cable release in operative relation to the shutter moving means.

17. An adapter for operatively coupling an automated camera to an optical instrument for the purpose of photographing an image provided by the instrument and for selectively modifying a preprogrammed cycle of camera operation to facilitate taking such photographs, the automated camera being of the type which upon actuation automatically proceeds through a cycle of operation that includes a pre-exposure phase during which a reflex member moves from an initial position to an exposure position, followed by an exposure phase, under the control of a light sensing circuit formed in part by a camera mounted photocell, during which a shutter operates to allow image-bearing light received by the camera objective lens to expose a film unit within the camera, the length of the exposure interval being determined by the intensity of the image-bearing light incident upon the photocell, the exposure phase being followed by a post exposure phase during which the reflex member moves back to the initial position, followed by termination of the cycle, said adapter comprising:

an adapter body including means for receiving and supporting such an automated camera thereon;

means for coupling said adapter body to an optical instrument such that the objective lens of the camera supported thereon is operatively positioned to receive image-bearing light provided by the instrument;

means for diverting a portion of the image-bearing light provided by the optical instrument to the camera mounted photocell to serve as an input for the exposure interval controlling light sensing circuit and including a prismatic element having an input surface for receiving the portion of image-bearing light from the optical instrument and an output surface positioned in alignment with the photocell for transmitting the image-bearing light thereon; and means for inserting a delay into the automatic cycle of camera operation between the pre-exposure and film exposure phases for allowing vibrations induced by the movement of the reflex member during the pre-exposure phase to subside prior to the initiation of film exposure, said means for inserting the delay including a shutter mounted on said adapter body for movement between positions blocking and unblocking the transmission of image-bearing light provided by the optical instrument to the camera objective lens and said input surface of said prismatic element.

18. An adapter for operatively coupling an automated camera to an optical instrument for the purpose of photographing an image provided by the instrument and for selectively modifying a preprogrammed cycle of camera operation to facilitate taking such photographs, the automated camera being of the type which upon actuation automatically proceeds through a cycle of operation that includes a pre-exposure phase during which a reflex member moves from an initial position to an exposure position, followed by an exposure phase, under the control of a light sensing circuit formed in part by a camera mounted photocell, during which a shutter operates to allow image-bearing light received by the camera objective lens to expose a film unit within the camera, the length of the exposure interval being determined by the intensity of the image-bearing light incident upon the photocell, the exposure phase being followed by a post exposure phase during which the reflex member moves back to the initial position, followed by termination of the cycle, said adapter comprising:

an adapter body including means for receiving and supporting such an automated camera thereon;

means for coupling said adapter body to an optical instrument such that the objective lens of the camera supported thereon is operatively positioned to receive image-bearing light provided by the instrument;

means for diverting a portion of the image-bearing light provided by the optical instrument to the camera mounted photocell to serve as an input for the exposure interval controlling light sensing circuit and being mounted on said adapter body for movement between an operative position wherein it extends into the light transmission path from the optical instrument to the camera lens and an inoperative position where it is located out of said light transmission path and is ineffective to provide an input for the light sensing circuit; and means for inserting a delay into the automatic cycle of camera operation between the pre-exposure and film exposure phases for allowing vibrations induced by the movement of the reflex member during the pre-exposure phase to subside prior to the initiation of film exposure and including a shutter mounted for movement between positions blocking and unblocking the transmission of image-bearing light to the camera lens and said light diverting means located in said operative position.

19. An adapter as defined in claim 18 wherein said adapter is operative in a first mode when said light diverting means is located in said operative position for inserting the delay by moving said shutter to said blocking position, initiating a cycle of camera operation which proceeds through the preexposure phase, then moving the shutter to the unblocking position to initiate the film exposure phase, which is terminated in response to a signal provided by the light sensing circuit, said adapter also being operative is a second mode when said light diverting means is located in said inoperative position for inserting the delay by moving said shutter to the blocking position, initiating exposure by moving said shutter to the unblocking position and terminating exposure by moving the shutter once again to said blocking position.

20. A method of inserting a delay into a preprogrammed cycle of operation of an automated camera when said camera is utilized under conditions such that the movement of a camera reflex member induces vibrations which are detrimental to film exposure, said camera being of the type which upon actuation automatically proceeds through a cycle of operation that includes a pre-exposure phase during which said reflex member moves from an initial position to an exposure position, followed by an exposure phase, under the control of a light sensing circuit formed in part by a camera mounted photocell, during which a shutter operates to allow image-bearing light received by the camera objective lens to expose a film unit within said camera, the length of the exposure interval being determined by the intensity of the image-bearing light incident upon the photocell, the exposure phase being followed by a post exposure phase during which said reflex member moves back to the initial position, followed by termination of the cycle, said method comprising the steps of:

blocking the transmission of image-bearing light to said camera objective lens and photocell;

actuating said camera to initiate said preprogrammed cycle of operation whereby said reflex member moves from said initial position to said exposure position;

maintaining the blockage of transmission of image-bearing light to said objective lens and said photocell for a period following the movement of said reflex member from said initial position to said exposure position until vibrations induced by the movement of said reflex member have subsided thereby interrupting said preprogrammed cycle of operation and inserting a delay between said pre-exposure and exposure phases; and then unblocking the transmission of image-bearing light to said objective lens and said photocell to initiate said exposure phase and the remainder of said preprogrammed cycle of camera operation.

21. A method of overriding a preprogrammed cycle of operation of an automated, battery operated camera for making relatively long time exposure, said camera being of the type which upon actuation proceeds automatically through a cycle of operation including a film exposure phase under the control of a light sensing circuit which provides an exposure terminating signal and is formed in part by a camera mounted photocell, the exposure interval being determined by the intensity of image-bearing light incident upon said photocell, said camera further including a timing circuit that automatically provides an exposure terminating signal at the end of a predetermined exposure interval when the intensity of light incident upon said photocell is insufficient to cause exposure termination within said predetermined interval, said camera also including an electrical switch that is operative by moving a latching member on the exterior of said camera from a latching position to an unlatching position for disconnecting a battery from a camera cycle power and control circuit, said latching member being operative for latching a portion of the camera in an operative position when said latch member is located in said latching position, said method comprising the steps of:

supporting said portion of said camera in said operative position such that said portion is maintained in said operative position when said latching member is moved from said latching position to said unlatching position;

actuating said camera to initiate said preprogrammed cycle of operation;

moving said latching member from said latching position to said unlatching position after initiation of said exposure phase and before the end of said predetermined exposure interval controlled by said timing circuit for operating said switch to disconnect the battery from said cycle power and control circuit thereby suspending said preprogrammed cycle of operation with said camera maintained in the exposure mode; and then moving said latching member from said unlatching position to said latching position after the desired exposure interval to operate said switch for reconnecting the battery to said cycle power and control circuit to resume said preprogrammed cycle of operation.

22. The method of claim 21 further including the step of providing a light input to said photocell after the battery is reconnected to said cycle power and control circuit such that said light sensing circuit provides an exposure terminating signal for terminating said exposure phase.

* * * * *